(12) United States Patent
Håkansson et al.

(10) Patent No.: US 11,777,363 B2
(45) Date of Patent: Oct. 3, 2023

(54) ELECTRIC MACHINE WITH HEAT EXCHANGING UNIT ON SURFACE OF HOUSING AND COOLING DUCT IN ROTOR

(71) Applicant: Volvo Car Corporation, Gothenburg (SE)

(72) Inventors: Emil Håkansson, Gothenburg (SE); Joakim Ehn, Gothenburg (SE); Johan Andersson, Gothenburg (SE); Johan Brunberg, Gothenburg (SE)

(73) Assignee: VOLVO CAR CORPORATION, Gothenburg (SE)

( * ) Notice: Subject to any disclaimer, the term of this patent is extended or adjusted under 35 U.S.C. 154(b) by 149 days.

(21) Appl. No.: 17/243,929

(22) Filed: Apr. 29, 2021

(65) Prior Publication Data

US 2022/0352781 A1 Nov. 3, 2022

(51) Int. Cl.
*H02K 5/20* (2006.01)
*H02K 5/18* (2006.01)
*H02K 9/19* (2006.01)

(52) U.S. Cl.
CPC ............... *H02K 5/203* (2021.01); *H02K 5/18* (2013.01); *H02K 9/19* (2013.01)

(58) Field of Classification Search
CPC .................................. H02K 1/32; H02K 9/00
See application file for complete search history.

(56) References Cited

U.S. PATENT DOCUMENTS

| 2,879,032 | A | * | 3/1959 | Whittle | ...................... E21B 4/02 173/8 |
| 2012/0049665 | A1 | | 3/2012 | Garriga et al. | |
| 2018/0287452 | A1 | * | 10/2018 | Kim | ....................... H02K 11/25 |
| 2018/0323682 | A1 | | 11/2018 | Sime | |

FOREIGN PATENT DOCUMENTS

| CN | 110022034 A | * | 7/2019 | ............... H02K 1/20 |
| CN | 209963861 U | | 1/2020 | |
| CN | 111313616 A | | 6/2020 | |
| DE | 10 2016 218 823 A1 | | 3/2018 | |
| EP | 0 989 658 A1 | | 3/2000 | |

OTHER PUBLICATIONS

Fan (CN 110022034 A) English Translation (Year: 2019).*
The Extended European Search Report received for European Patent Application Serial No. 22170831.6, dated Mar. 20, 2023, 14 pages.

* cited by examiner

*Primary Examiner* — Tulsidas C Patel
*Assistant Examiner* — Robert E Mates
(74) *Attorney, Agent, or Firm* — Amin, Turocy & Watson, LLP

(57) ABSTRACT

The present disclosure relates to an electric machine, a vehicle comprising such an electric machine and a manufacturing method for such an electric machine.

The electric machine comprises a stator unit, a rotor unit, a housing, and a heat exchanging unit. The stator unit and the rotor unit are arranged inside the housing and the housing comprises an inlet port configured to provide a medium inside the housing and an outlet port configured to release the medium out of the housing. The heat exchanging unit is coupled with each of the inlet port and the outlet port and comprises a plurality of channels arranged on an outer surface of the housing. The plurality of channels being configured to transfer heat between the medium and the environment.

20 Claims, 6 Drawing Sheets

ELECTRIC MACHINE WITH HEAT EXCHANGING UNIT ON SURFACE OF HOUSING AND COOLING DUCT IN ROTOR

TECHNICAL FIELD

The present disclosure relates to an electric machine, a vehicle comprising such an electric machine and a manufacturing method for such an electric machine.

BACKGROUND ART

Electric machines are used in electric or hybrid vehicles as a traction motor. The traction motor in vehicles is generally configured to generate power for providing a wheel torque to propel the vehicle and to recover braking energy if a regenerative braking system is used. Such electric machines may however produce significant heat inside them. For example, heat may be generated in an electric machine due to an electric resistance in electric current flowing through a rotor and/or stator, hysteresis losses due to changing magnetic fields and resistive heating of eddy currents caused by magnetic fields. Additionally, heat may be also generated due to mechanical friction among components in the electric machine.

In electric machines, however, thermal capacities of rotor magnets and stator windings affect available output power of the electric machines. The rotor magnets typically have a thermal limit of 150° C. and when temperature increases above the thermal limit, demagnetization may occur which reduces performance of the electric machine. The stator, which may comprise multiple copper wires, are insulated with a material, which has a temperature limit of 180° C. If the temperature exceeds 180° C., thermal fatigue cracks can occur which can cause shortcut and terminate the electric machine.

SUMMARY

Hence, there may be a need to provide an improved electric machine, which facilitates an efficient heat transfer.

The problem is solved by the subject matters of the independent claims of the present disclosure, wherein further embodiments are incorporated in the dependent claims. It should be noted that the aspects of the disclosure described in the following apply to the electric machine, a vehicle comprising such an electric machine and a manufacturing method for such an electric machine.

According to the present disclosure, an electric machine is presented. The electric machine comprises a stator unit, a rotor unit, a housing, and a heat exchanging unit. The stator unit and the rotor unit are arranged inside the housing and the housing comprises an inlet port configured to provide a medium inside the housing and an outlet port configured to release the medium out of the housing. The heat exchanging unit is coupled with each of the inlet port and the outlet port and comprises a plurality of channels arranged on an outer surface of the housing. The plurality of channels being configured to transfer heat between the medium and the environment.

The electric machine according to the present disclosure may facilitate a heat transfer in the electric machine by providing the heat exchanging unit directly on the outer surface of the housing. In other words, due to a short distance to the heat exchanging unit, the medium may transfer heat more efficiently. Consequently, a thermal management of the electric machine may be facilitated and a performance of the electric machine may be improved. In addition, due to the direct arrangement of the heat exchanging unit, the electric machine may be manufactured compactly.

The electric machine can be understood as an electromechanical converter that may generate mechanical power from electrical energy. Mechanical output, which may be transferred via a shaft, may act as a propulsion means for operating a device. The electric machine may comprise a housing, in which the stator unit and the rotor unit may be coaxially arranged, wherein the stator unit may be fixedly arranged in the housing and the rotor unit may be configured to rotate inside the stator unit around a longitudinal axis of the electric machine. Each of the stator unit and the rotor unit may comprise either a permanent magnet or an electromagnet comprising coil windings.

The inlet port and the outlet port may be arranged on the outer surface of the housing and configured to deliver the medium into the housing or discharge the medium out of the housing. The medium may be in a gas state, a liquid state or a mixing state of gas and liquid. The medium may be water, oil, air, water vapor or the like. The medium may be selected so that it is suitable for transferring heat. In other words, the medium may be configured to transfer heat generated inside the electric machine out of the electric machine. The inlet port and the outlet port may be arranged at the same side, i.e. non-drive end or drive end of the electric motor or spaced apart from each other.

Since the outlet port may be connected to the heat exchanging unit, the medium released out of the housing may be directly guided to the heat exchanging unit. The heat-absorbed medium may transfer heat to the environment during circulating through the plurality of channels of the heat exchanging unit. The channels may form a flow passage of the medium, which may increase a heat transfer area. Accordingly, the medium may be cooled efficiently and fed back into the housing via the inlet port, which may be also directly connected to the heat exchanging unit.

In an embodiment, the plurality of channels is integrated on the outer surface of the housing. The plurality of the channels may be integrally manufactured together with the housing. Alternatively, the channels may be separately formed and fixedly attached on the outer surface of the housing, for example by using screws. The heat exchanging unit may be arranged on at least a portion of the outer surface of the housing. However, the heat exchanging unit may be also located on the entire outer surface of the housing. Accordingly, a compact electric machine performing more efficient heat transfer may be manufactured.

In an embodiment, the heat exchanging unit comprises a pump means disposed directly at the housing. The pump means may be configured to support a reliable circulation of the medium inside the heat exchanging unit. In general, the heat exchanging unit is arranged apart from the housing of the electric machine and connected to the electric machine via a pump means, which is separately arranged from the electric machine either. According to the present disclosure, however, the pump means may be arranged directly on the outer surface of the housing. Hence, a circulation of medium may be facilitated and the electric machine may be manufactured compactly.

In an embodiment, the heat exchanging unit is coupled with each of the inlet port and the outlet port of the housing via a divider element. The divider element may be configured for facilitating a distribution of the medium between the heat exchanging unit and the rotor unit. Hence, the divider unit may guide the inflow and the outflow of the medium in a correct direction.

In an embodiment, the heat exchanging unit further comprises an air cooling element configured to cool a backside of the stator unit. The backside of the stator unit can be understood as the outer portion of the stator unit facing an inner wall of the housing. The backside of the stator unit is generally difficult to cool by means of a coolant fed into the housing due to its complex structure. By providing the air cooling element such as air chamber on the outer surface of the housing, the backside of the stator unit may be also cooled through the inner wall of the housing.

In an embodiment, the rotor unit comprises a rotor shaft extending along an axial direction of the rotor unit. A plurality of magnet elements is arranged around the rotor shaft and at least one duct is arranged between the rotor shaft and the plurality of magnet elements. The duct extends at least partially along a longitudinal direction of the shaft and the duct is connected to each of the inlet port and the outlet port of the housing.

The rotor shaft may be a driving shaft, which is configured to transmit a mechanical energy to a device to be propelled. The magnet elements may comprise a permanent magnet or an electromagnet to rotate the rotor unit caused by electromagnetic energy between the plurality of the magnet elements and the stator unit. The duct, in other words medium passage, may be configured to provide the medium between the plurality of magnet elements and the rotor shaft. Hence, the magnet elements or a rotor core may be cooled by contact the medium directly.

To allow a circulation of the medium in the rotor unit, the rotor unit may comprise at least two ducts. The first duct may be configured to receive the fresh medium via the inlet port and the second duct may be configured to release the heat-absorbed medium out of the rotor unit via the outlet port. The ducts may extend along the arrangement of the magnet elements in the longitudinal direction of the rotor shaft to cool an inner portion of the magnet elements efficiently.

In an embodiment, the electric machine further comprises a plurality of ducts arranged between the rotor shaft and the plurality of magnet elements. In other words, the rotor unit may comprise the plurality of ducts arranged around the rotor shaft in the longitudinal direction of the rotor shaft. In an embodiment, the plurality of ducts is configured to deliver an inflow and an outflow of the medium alternately. Some of the ducts may be configured to receive the fresh medium supplied from the heat exchanging unit and other ducts may be configured to release the heat-absorbed to the heat exchanging unit. Accordingly, heat may be evacuated from the rotor shaft and the magnet elements may be efficiently cooled.

In an embodiment, the inlet port and the outlet port are arranged at a non-drive end of the rotor shaft. The term "non-drive end of the rotor shaft" may be understood as a portion of the rotor shaft, which may not be connected to a drive unit of the device to be propelled. In an embodiment, the divider element may be arranged at the non-drive end of the rotor shaft for facilitating a distribution of the medium between the heat exchanging unit and the rotor unit. Hence, the divider unit may guide the inflow and the outflow of the medium in a correct direction.

In an embodiment, the medium is an oil. The oil may be any lubricant, which may be adapted to reduce friction and heat between surfaces in mutual contact. The oil may form a film in the ducts between the rotor shaft unit and the plurality of the magnet elements to enhance the heat transfer. Alternatively, the medium may be provided in a mixing state of the oil comprising both of gas and liquid phases. It is, however, surprisingly found that the oil film may improve the heat transfer more efficiently than the mixing phase.

According to the present disclosure, a further electric machine is presented. The electric machine comprises a stator unit, a rotor unit with a rotor shaft, a housing and an insert element. The stator unit and the rotor unit are arranged coaxially inside the housing. The rotor shaft comprises a cavity extending at least partially along a longitudinal axis of the rotor shaft to receive a medium. The rotor shaft further comprises a medium inlet opening and at least one medium outlet opening. The insert element is arranged in the cavity and abutting on the medium outlet opening and configured to at least partially block the medium outlet opening depending on a rotation rate of the rotor shaft.

To control the temperature of an inside of the rotor shaft facing a plurality of magnet elements, the medium or coolant may be fed in the rotor shaft. In other words, the rotor shaft may be formed as a hollow rotor shaft. The rotor shaft may be divided into three portions, i.e. a first shaft portion, a body portion and a second shaft portion, wherein the body portion may be located between the first shaft portion and the second shaft portion. The medium inlet opening may be arranged in the first shaft portion along an axial direction of rotor shaft to receive the medium inside the rotor shaft.

The rotor shaft, in particular the body portion may comprise at least one medium outlet opening arranged essentially close to the medium inlet opening or the first shaft portion in a radial direction of the body portion. The medium outlet opening may be configured to redirect the medium provided via the medium inlet opening to an outside of the rotor unit in direction to the stator unit.

The insert element may be arranged between the first shaft portion and the body portion. Generally, the first shaft portion has a smaller diameter than the body portion. Accordingly, the insert element may be formed in a conical shape to be appropriately mounted between the medium inlet opening/first shaft portion and the body portion. Further, the conical shape of the insert element allows at least partially covering the medium outlet opening. Hence, the insert element may control an amount of the medium guided from the medium inlet opening to the outside of the rotor unit by fully or at least partially opening and/or closing the medium outlet opening according to the rotation rate of the rotor shaft.

In an embodiment, the rotor shaft comprises a plurality of medium outlet openings arranged on the rotor shaft in a circumferential direction of the rotor shaft. The body portion of the rotor shaft may comprise several medium outlet openings arranged in the radial direction of the body portion. The medium outlet openings may be arranged spaced apart from one another along the circumferential direction of the body portion or the rotor shaft.

In an embodiment, the insert element comprises a plurality of apertures abutting on the plurality of medium outlet openings. The plurality of the apertures may be arranged along the circumferential direction of the insert element. Hence, if the plurality of apertures exactly abuts on the medium outlet openings of the rotor shaft, the medium provided via the medium inlet opening may be guided to the outside of the rotor unit through the fully opened medium outlet openings. In contrast, if the plurality of apertures of the insert element is disposed offset from the medium outlet openings in the radial direction of the rotor shaft, for example by rotating the insert element, the medium outlet openings may be fully closed by the insert element. Hence, the entire amount of the medium provided through the medium inlet opening may be fed in the cavity or body portion of the rotor shaft.

In an embodiment, the medium outlet opening of the rotor shaft is configured to provide the medium to the stator unit. The medium released through the medium outlet openings of the rotor shaft may be directed to the outside of the rotor unit to cool the stator unit either. Accordingly, by controlling an opening ratio of the medium outlet openings, either the body portion of the rotor shaft, i.e. cavity of the rotor unit may be more cooled than the stator unit or the stator unit and/or outside the rotor unit may be more cooled than the cavity of the rotor shaft by the medium.

In an embodiment, the insert element is attached to the rotor shaft using a spring means and the spring means is configured to rotate the insert element such that the medium outlet opening of the rotor shaft being at least partially blocked by the insert element. The spring means may be configured to control the opening ratio of the medium outlet openings by rotating the insert element.

In an embodiment, the spring means is configured to adjust a blocking proportion of the medium outlet opening by the insert element based on a rotation rate of the rotor shaft. Accordingly, if the rotor shaft drives at a high rotation rate, for example faster than 5000 rpm, a blocking proportion of the insert element may be increased such that the medium provided through the medium inlet opening may be mostly guided to the cavity of the body portion of the rotor shaft to cool, for example the magnet elements of the rotor unit. In contrast, if the rotor shaft operates at a lower rotation rate, the blocking proportion of the insert element may be reduced or the opening ratio of the medium outlet openings may be increased. Accordingly, the medium may be directed to the stator unit to cool, for example coil windings.

In an embodiment, the amount of the medium, which may be provided outside the rotor unit via the medium outlet opening, may be determined based on a number and/or size of the medium outlet openings and the apertures of the insert element, inflow rate of the medium through the medium inlet opening and/or the rotation rate of the rotor shaft.

In an embodiment, the spring means may be configured to completely block the plurality of medium outlet openings by the insert element at a higher rotation rate of the rotor shaft. If the rotation rate of the rotor shaft increases a pre-defined rotation rate, the insert element may completely block all of the medium outlet openings such that no medium inserted through the medium inlet opening may be guided to the outside of the rotor unit but fed in the body portion to cool the magnet elements directly arranged at an outer surface of the rotor shaft.

In an embodiment, the insert element and the plurality of medium outlet openings are arranged at the non-drive end of the rotor shaft. In an embodiment, the medium inlet opening being arranged at the non-drive end of the rotor shaft. Accordingly, the medium may be provided into the rotor shaft from an opposite side to a device to be propelled by the electric machine. To provide the medium for cooling the outside of the rotor unit, the insert element and the plurality of medium outlet openings may be also arranged at the same side as the medium inlet opening to directly divert a medium flow.

In an embodiment, the electric machine further comprises a heat exchanging unit comprising a plurality of channels arranged directly on an outer surface of the housing. Accordingly, due to a short distance to the heat exchanging unit, the medium may transfer heat more efficiently and a thermal management of the electric machine may be facilitated. Consequently a performance of the electric machine may be improved. In addition, due to the direct arrangement of the heat exchanging unit, the electric machine may be manufactured compactly.

According to the present disclosure, a vehicle is presented. The vehicle comprises an electric machine with a stator unit, a rotor unit, a housing, and a heat exchanging unit. The stator unit and the rotor unit are arranged inside the housing and the housing comprises an inlet port configured to provide a medium inside the housing and an outlet port configured to release the medium out of the housing. The heat exchanging unit is coupled with each of the inlet port and the outlet port and comprises a plurality of channels arranged on an outer surface of the housing. The plurality of channels being configured to transfer heat between the medium and the environment.

In an embodiment, the vehicle may be a battery electric vehicle or a hybrid electric vehicle. In such vehicles, the electric machine may act as a traction motor supply power to wheels to propel the vehicle. The traction motor may however produce significant heat inside the electric machine. The vehicle according to the present disclosure allows an improved thermal management inside the electric machine by arranging the heat exchanging unit directly on the outer surface of the housing.

According to the present disclosure, also a manufacturing method for an electric machine maybe presented. The manufacturing method comprises, but not necessarily in the following order:

providing a housing comprising an inlet port and an outlet port, the inlet port being configured to provide a medium inside the housing and an outlet port being configured to release the medium out of the housing, arranging a stator unit and a rotor unit coaxially inside a housing, arranging a heat exchanging unit comprising a plurality of channels arranged on an outer surface of the housing, and coupling the heat exchanging unit with each of the inlet port and the outlet port, the plurality of channels being configured to transfer heat between the medium and the environment.

It should be noted that the above embodiments may be combined with each other irrespective of the aspect involved. Accordingly, the method may be combined with structural features and, likewise, the system may be combined with features described above with regard to the method.

These and other aspects of the present disclosure will become apparent from and elucidated with reference to the embodiments described hereinafter.

BRIEF DESCRIPTION OF DRAWINGS

Exemplary embodiments of the disclosure will be described in the following with reference to the following drawings.

DESCRIPTION OF EMBODIMENTS

Figure 1:
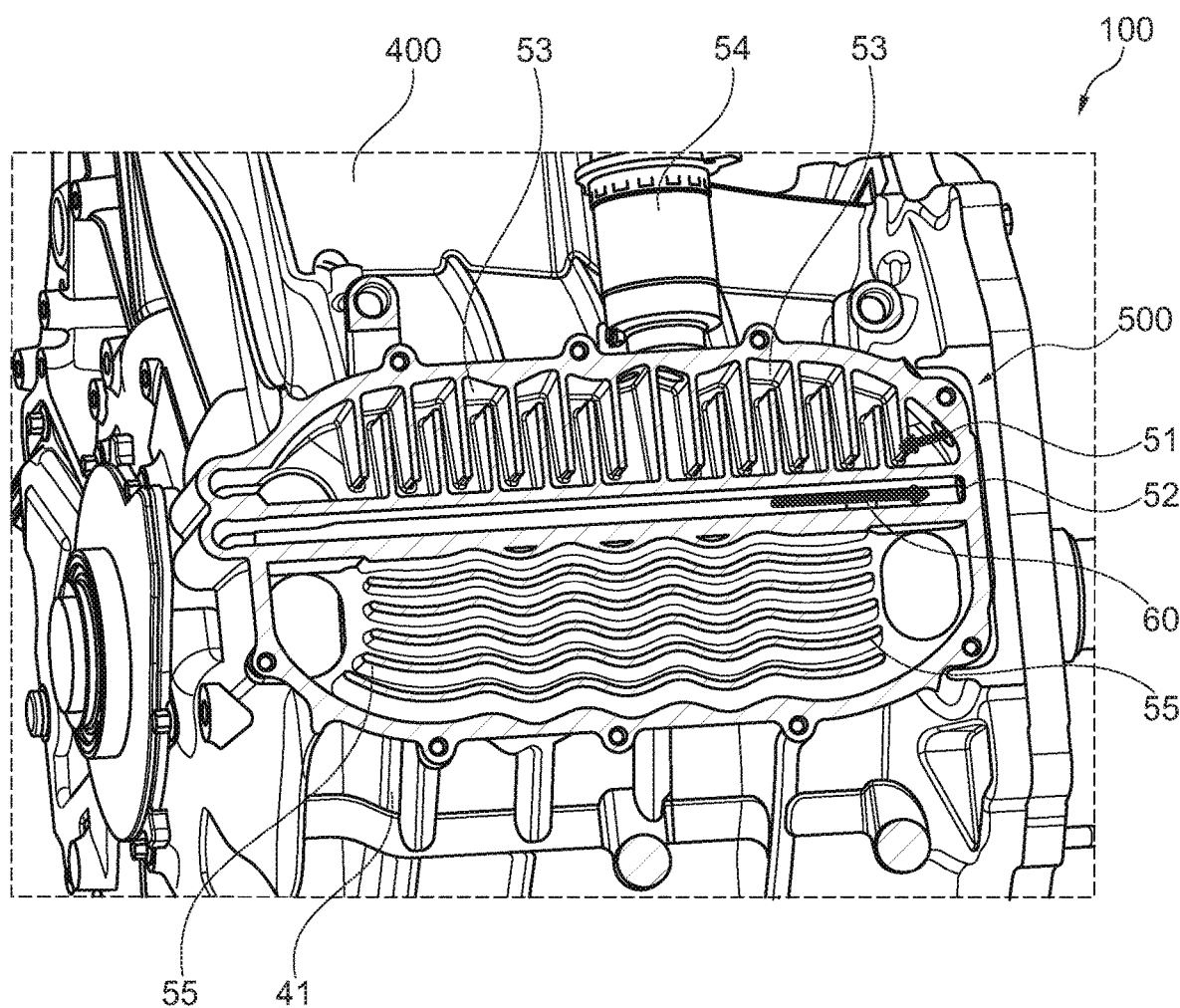
FIG. 1 shows schematically and exemplarily an embodiment of an electric machine according to the present disclosure.

FIG. 1 shows an electric machine 100, which may be mounted in a battery electric vehicle (BEV) or a hybrid electric vehicle (HEV) to provide kinetic energy to wheels of the vehicle, accordingly to propel the vehicle. Hence, the electric machine 100 acts as a traction motor, which generates, however, significant heat due to electromagnetic resistance or frictions among components of the electric machine 100.

The electric machine 100 comprises a stator unit 200, a rotor unit 300 and a housing 400. The stator unit 200 and the rotor unit 300 are coaxially arranged inside the housing 400, wherein the stator unit 200 is fixedly arranged in the housing 400 and the rotor unit 300 is surrounded by the stator unit 200 and configured to rotate around a longitudinal axis of the electric machine 100 due to electromagnetic energy.

Figure 2:
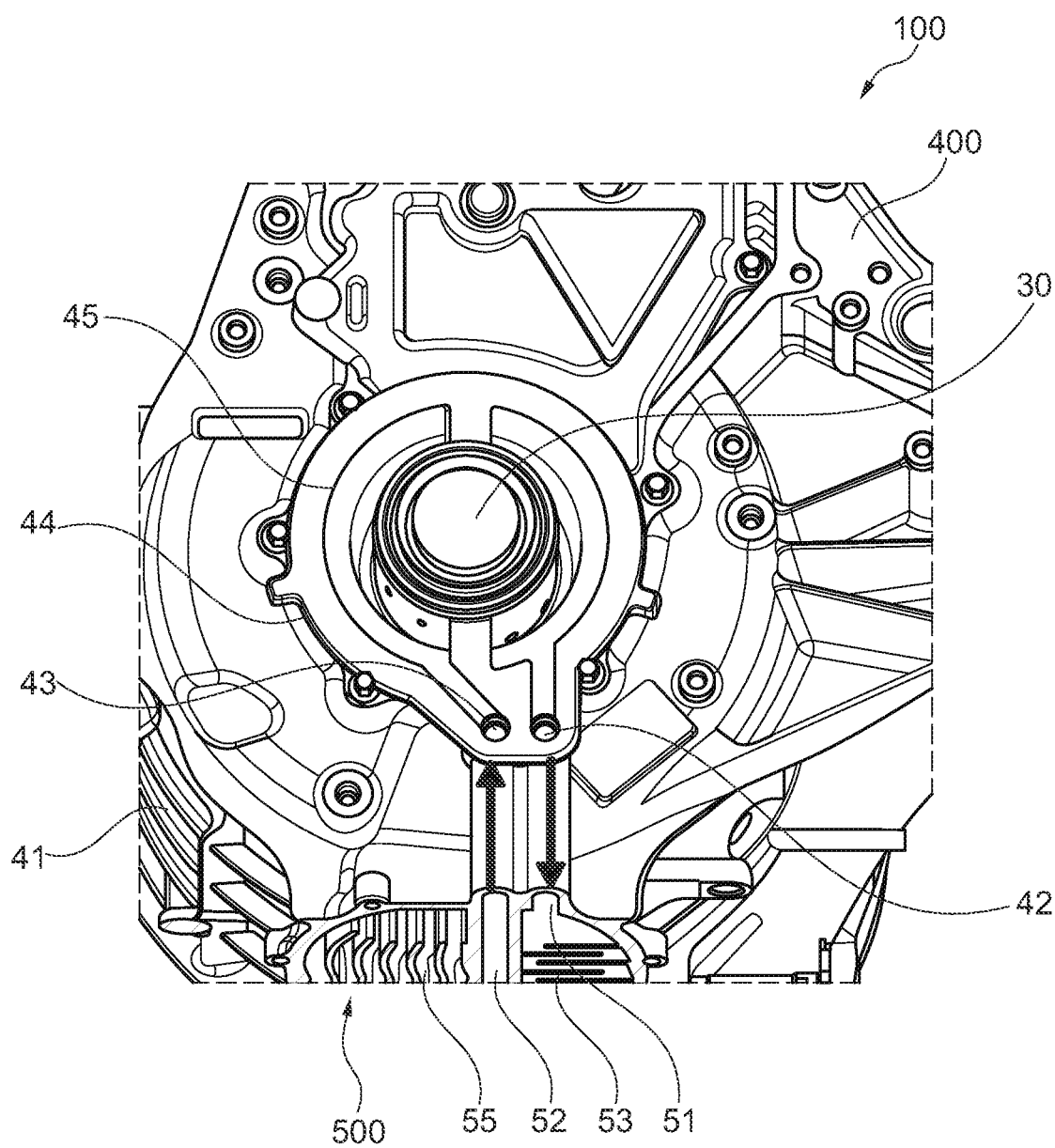
FIG. 2 shows schematically and exemplarily an embodiment of an electric machine according to the present disclosure.

The electric machine 100 further comprises a heat exchanging unit 500 arranged at an outer surface 41 of the housing 400. The housing 400 comprises an inlet port 42 configured to provide a medium 60 or coolant inside the housing 400 and an outlet port 43 configured to release the medium 60 out of the housing 400. The heat exchanging unit 500 is coupled with each of the inlet port 42 and the outlet port 43 of the housing 400. In particular, an inflow port 51 of the heat exchanging unit 500 is connected to the outlet port 43 of the housing 400 and an outflow port 52 of the heat exchanging unit 500 is connected to the inlet port 42 of the housing 400 as shown in FIG. 2.

A medium exchange portion 44, at which the medium 60 out of the housing 400 is guided to the heat exchanging unit 500 and the medium 60 out of the heat exchanging unit 500 is guided into the housing 400, may be arranged at a non-drive end of the rotor shaft, which is disposed opposite to a propulsion end relative to the rotor shaft. At the non-drive end of the rotor shaft, a divider element 45 may be arranged for facilitating a distribution of the medium 60 between the heat exchanging unit 500 and the rotor unit 300.

The medium 60 may be for example an oil. The oil may be any lubricant, which may be adapted to reduce friction and heat between surfaces in mutual contact. The oil may be provided in form of a film or a mixing state comprising both of gas and liquid phases. Preferably, the oil is provided in form of a film, which may improve the heat transfer more efficiently than the mixing state.

The heat exchanging unit 500 comprises a plurality of channels 53 configured to transfer heat between the medium 60 fed from the housing 400 and the environment. The plurality of the channels 53 is integrated on the outer surface 41 of the housing 400. The plurality of the channels 53 may be integrally manufactured together with the housing 400. Alternatively, the channels 53 may be separately formed and fixedly attached on the outer surface 41 of the housing 400. The heat exchanging unit 500 may be arranged on at least a portion of the outer surface 41 of the housing 400. However, the heat exchanging unit 500 may also cover the entire outer surface 41 of the housing 400.

The heat exchanging unit 500 further comprises a pump means 54 disposed directly at the housing 400. The pump means 54 may be configured to support a reliable circulation of the medium 60 inside the heat exchanging unit 500. The heat exchanging unit 500 further comprises an air cooling element 55 configured to cool a backside of the stator unit 200. The backside of the stator unit 200 is generally difficult cool by means of the medium 60 fed into the housing 400 due to its complex structure. By providing the air cooling element 55 such as air chamber on the outer surface 41 of the housing 400, the backside of the stator unit 200 may be also cooled through the housing 400.

Figure 3:
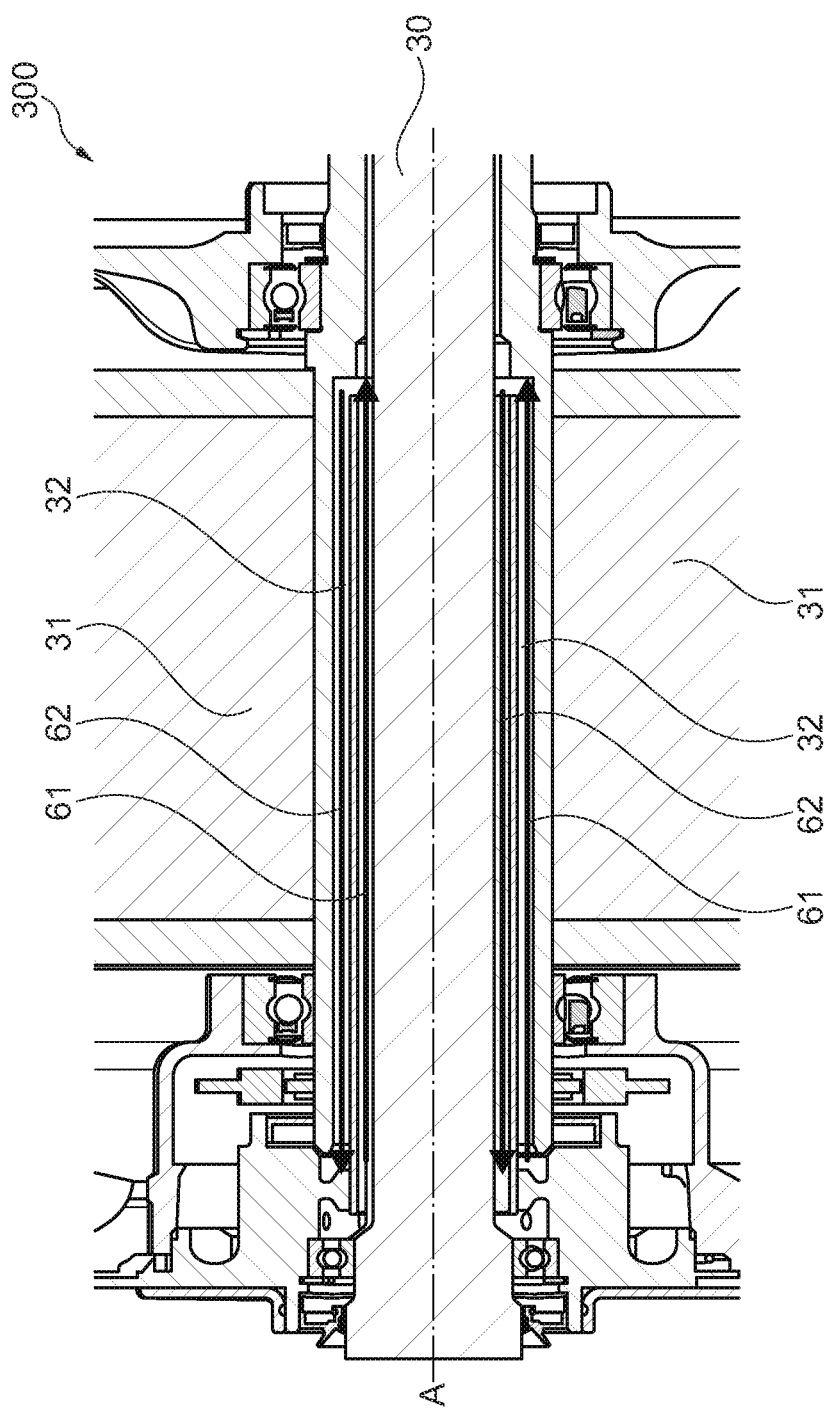
FIG. 3 shows schematically and exemplarily an embodiment of a rotor unit according to the present disclosure.

FIG. 3 shows the rotor unit 300 comprising a rotor shaft 30, which extends along an axial direction of the rotor unit 300 or the longitudinal direction of the electric machine 100. At least one duct 32 is arranged between the rotor shaft 30 and a plurality of magnet elements 31 arranged at least partially around the rotor shaft 30. The duct 32 extends at least partially along a longitudinal direction of the rotor shaft 30 and the duct 32 is connected to each of the inlet port 42 and the outlet port 43 of the housing 400.

To allow a circulation of the medium 60 in the rotor unit 300, the rotor unit 300 comprises at least two ducts 32 or medium passages. The first duct 32 is configured to receive the fresh medium 60 via the inlet port 42 and the second duct 32 may be configured to discharge the heat-absorbed medium 60 out of the rotor unit 300 via the outlet port 43. The ducts 32 extend along the arrangement of the magnet elements 31 in the longitudinal direction of the rotor shaft 30 to cool an inner portion of the magnet elements 31 efficiently.

Figure 4:
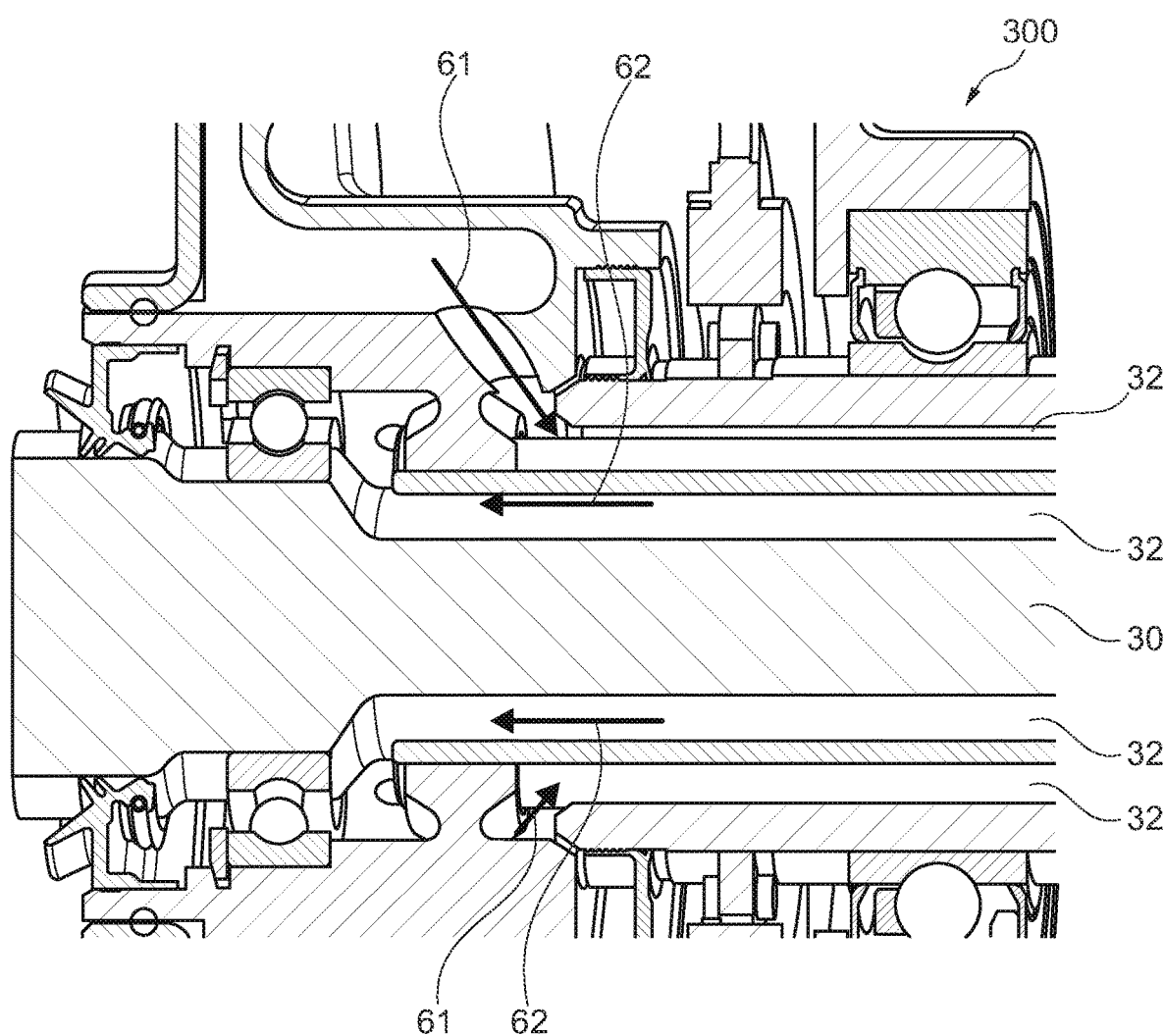
FIG. 4 shows schematically and exemplarily an embodiment of a rotor unit according to the present disclosure.

However, the rotor unit 300 may also comprise a plurality of ducts 32 arranged around the rotor shaft 30 in the longitudinal direction of the rotor shaft 30 (see also FIG. 4). The plurality of ducts 32 is configured to deliver an inflow 61 and an outflow 62 of the medium 60 alternately. Hence, some of the ducts 32 may be configured to receive the fresh medium 60 supplied from the heat exchanging unit 500 and other ducts 32 may be configured to release the heat-absorbed to the heat exchanging unit 500. Accordingly, the heat may be evacuated form the rotor shaft 30 and the magnet elements 31 may be efficiently cooled.

Figure 5:
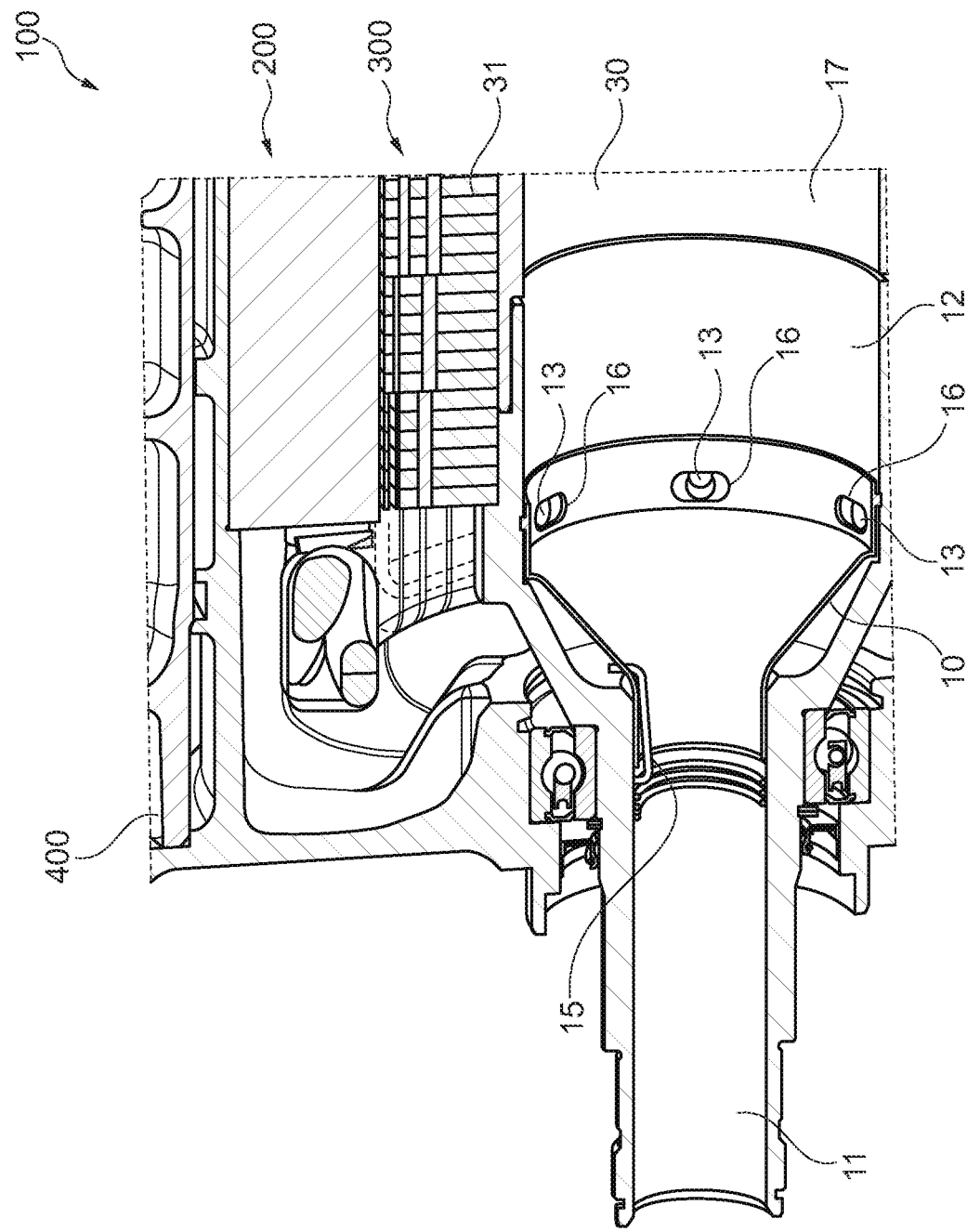
FIG. 5 shows schematically and exemplarily another embodiment of an electric machine according to the present disclosure.

FIG. 5 shows another electric machine 100, which is also configured to efficiently perform heat transfer. The electric machine 100 comprises a stator unit 200, a rotor unit 300 with a rotor shaft 30 and a housing 400. The stator unit 200 and the rotor unit 300 are arranged coaxially inside the housing 400. The rotor shaft 30 comprises a cavity 17 extending at least partially along a longitudinal axis of the rotor shaft 30 to receive a medium 60.

To cool the cavity 17 of the rotor shaft 30 facing a plurality of magnet elements 31, the medium 60 or coolant may be fed in the rotor shaft 30. Accordingly, the rotor shaft 30 further comprises a medium inlet opening 11 and a plurality of medium outlet openings 13. The medium inlet opening 11 is arranged along an axial direction of rotor shaft 30 to receive the medium 60 and the plurality of medium outlet openings 13 is arranged in a radial direction of the rotor shaft 30 essentially close to the medium inlet opening 11. The plurality of medium outlet openings 13 is configured to redirect the medium 60 provided via the inlet opening in direction to the stator unit 200.

The electric machine 100 further comprises an insert element 10, which is formed conically and arranged between the medium inlet opening 11 and the cavity 17. The insert element 10, the plurality of medium outlet openings 13 and the medium inlet opening 11 are arranged at the non-drive end of the rotor shaft 30. The insert element 10 is configured to at least partially block the medium outlet openings 13 depending on a rotation rate of the rotor shaft 30. The insert element 10 comprises a plurality of apertures 16 arranged along a circumferential direction of the insert element 10. The plurality of apertures 16 abuts on the plurality of medium outlet openings 13.

The insert element 10 further comprises a spring means 15, which fixedly attach the insert element 10 to the rotor shaft 30. The spring means 15 is further configured to rotate the insert element 10 such that the medium outlet openings 13 of the rotor shaft 30 can be at least partially blocked by the insert element 10. In other words, the spring means 15 may adjust a blocking proportion of the medium outlet openings 13 by the insert element 10.

Accordingly, if the rotor shaft 30 drives at a high rotation rate, for example faster than 5000 rpm, a blocking proportion of the insert element 10 may be increased by the spring means 15 such that the medium 60 provided through the medium inlet opening 11 may be mostly or even completely guided to the cavity 17 of the rotor shaft 30. In contrast, if the rotor shaft 30 operates at a lower rotation rate, the blocking proportion of the insert element 10 may be reduced and the medium 60 may be directed to the stator unit 200.

Figure 6:
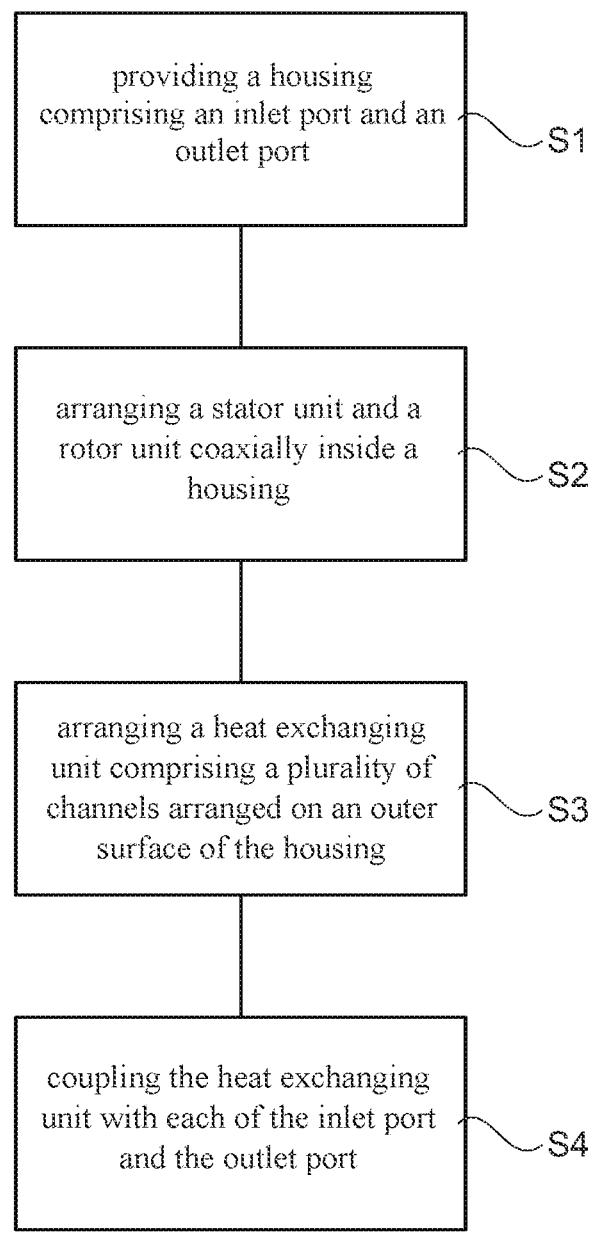
FIG. 6 shows schematically and exemplarily a manufacturing method for an electric machine according to the present disclosure.

FIG. 6 shows schematically the manufacturing method for an electric machine 100. The method comprises, but not necessarily in the following order:

providing S1 a housing 400 comprising an inlet port 42 and an outlet port 43, the inlet port 42 being configured to provide a medium inside the housing 400 and an outlet port 43 being configured to release the medium out of the housing 400, arranging S2 a stator unit 200 and a rotor unit 300 coaxially inside a housing 400, arranging S3 a heat exchanging unit 500 comprising a plurality of channels 53 arranged on an outer surface 41 of the housing 400, and coupling S4 the heat exchanging unit 500 with each of the inlet port 42 and the outlet port 43, the plurality of channels 53 being configured to transfer heat between the medium and the environment.

It has to be noted that embodiments of the disclosure are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the disclosure has been illustrated and described in detail in the drawings and description, such illustration and description are to be considered illustrative or exemplary and not restrictive. The disclosure is not limited to the disclosed embodiments. Other variations to the disclosed embodiments can be understood and effected by those skilled in the art in practicing a claimed disclosure, from a study of the drawings, the disclosure, and the dependent claims.

In the claims, the word "comprising" does not exclude other elements or steps, and the indefinite article "a" or "an" does not exclude a plurality. A single processor or other unit may fulfil the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. An electric machine comprising:
   a stator unit;
   a rotor unit with a rotor shaft;
   a housing; and
   an insert element,
   the stator unit and the rotor unit being arranged coaxially inside the housing,
   the rotor shaft comprising a cavity extending at least partially along a longitudinal axis of the rotor shaft to receive a medium,
   the rotor shaft further comprising a medium inlet opening and a medium outlet opening,
   the insert element being arranged in the cavity and abutting on the medium outlet opening, and the insert element being attached to the rotor shaft using a spring means, the spring means being configured to rotate the insert element such that the medium outlet opening of the rotor shaft being at least partially blocked by the insert element,
   the insert element being configured to at least partially block the medium outlet opening depending on a rotation rate of the rotor shaft.

2. The electric machine according to claim 1, the rotor shaft comprising a plurality of medium outlet openings arranged on the rotor shaft in a circumferential direction of the rotor shaft.

3. The electric machine according to claim 2, the insert element comprising a plurality of apertures abutting on the plurality of medium outlet openings.

4. The electric machine according to claim 1, the medium outlet opening of the rotor shaft being configured to provide the medium to the stator unit.

5. The electric machine according to claim 1, the spring means being configured to adjust a blocking proportion of the medium outlet opening by the insert element based on the rotation rate of the rotor shaft.

6. The electric machine according to claim 1, the insert element and the plurality of medium outlet opening being arranged at a non-drive end of the rotor shaft.

7. The electric machine according to claim 1, the medium inlet opening being arranged at a non-drive end of the rotor shaft.

8. The electric machine according to claim 1, further comprising a heat exchanging unit comprising a plurality of channels arranged directly on an outer surface of the housing.

9. An electric machine comprising:
   a stator unit;
   a rotor unit with a rotor shaft;
   a housing; and
   an insert element,
   the stator unit and the rotor unit being arranged coaxially inside the housing,
   the rotor shaft comprising a cavity extending at least partially along a longitudinal axis of the rotor shaft to receive a medium,
   the rotor shaft further comprising a medium inlet opening and a plurality of medium outlet openings arranged on the rotor shaft in a circumferential direction of the rotor shaft,
   the insert element being arranged in the cavity and abutting on the plurality of medium outlet openings, the insert element being configured to at least partially block at least one of the plurality of medium outlet openings depending on a rotation rate of the rotor shaft.

10. The electric machine according to claim 9, the insert element comprising a plurality of apertures abutting on the plurality of medium outlet openings.

11. The electric machine according to claim 9, the plurality of medium outlet openings being configured to provide the medium to the stator unit.

12. The electric machine according to claim 9, the insert element being attached to the rotor shaft using a spring means, the spring means being configured to rotate the insert element such that the at least one of the plurality of medium outlet openings of the rotor shaft being at least partially blocked by the insert element.

13. The electric machine according to claim 12, the spring means being configured to adjust a blocking proportion of the least one of the plurality of medium outlet openings by the insert element based on the rotation rate of the rotor shaft.

14. The electric machine according to claim 9, the insert element and the plurality of medium outlet openings being arranged at a non-drive end of the rotor shaft.

15. The electric machine according to claim 9, the medium inlet opening being arranged at a non-drive end of the rotor shaft.

16. The electric machine according to claim 9, further comprising a heat exchanging unit comprising a plurality of channels arranged directly on an outer surface of the housing.

17. A vehicle comprising an electric machine, the electric machine comprising:
   a stator unit;
   a rotor unit with a rotor shaft;
   a housing; and
   an insert element,
the stator unit and the rotor unit being arranged coaxially inside the housing,
the rotor shaft comprising a cavity extending at least partially along a longitudinal axis of the rotor shaft to receive a medium,
the rotor shaft further comprising a medium inlet opening and at least one medium outlet opening,
the insert element being arranged in the cavity and abutting on the at least one medium outlet opening, and the insert element being attached to the rotor shaft using a spring means, the spring means being configured to rotate the insert element such that the at least one medium outlet opening of the rotor shaft being at least partially blocked by the insert element,
the insert element being configured to at least partially block the at least one medium outlet opening depending on a rotation rate of the rotor shaft.

18. The vehicle according to claim 17, the at least one medium outlet opening of the rotor shaft being configured to provide the medium to the stator unit.

19. The vehicle according to claim 17, the spring means being configured to adjust a blocking proportion of the at least one medium outlet opening by the insert element based on the rotation rate of the rotor shaft.

20. The vehicle according to claim 17, further comprising a heat exchanging unit comprising a plurality of channels arranged directly on an outer surface of the housing.

* * * * *